Oct. 5, 1937.  K. F. NÄGELE  2,094,715
APPARATUS FOR THE MANUFACTURE OF ZIP FASTENERS
Filed March 21, 1935  3 Sheets-Sheet 1
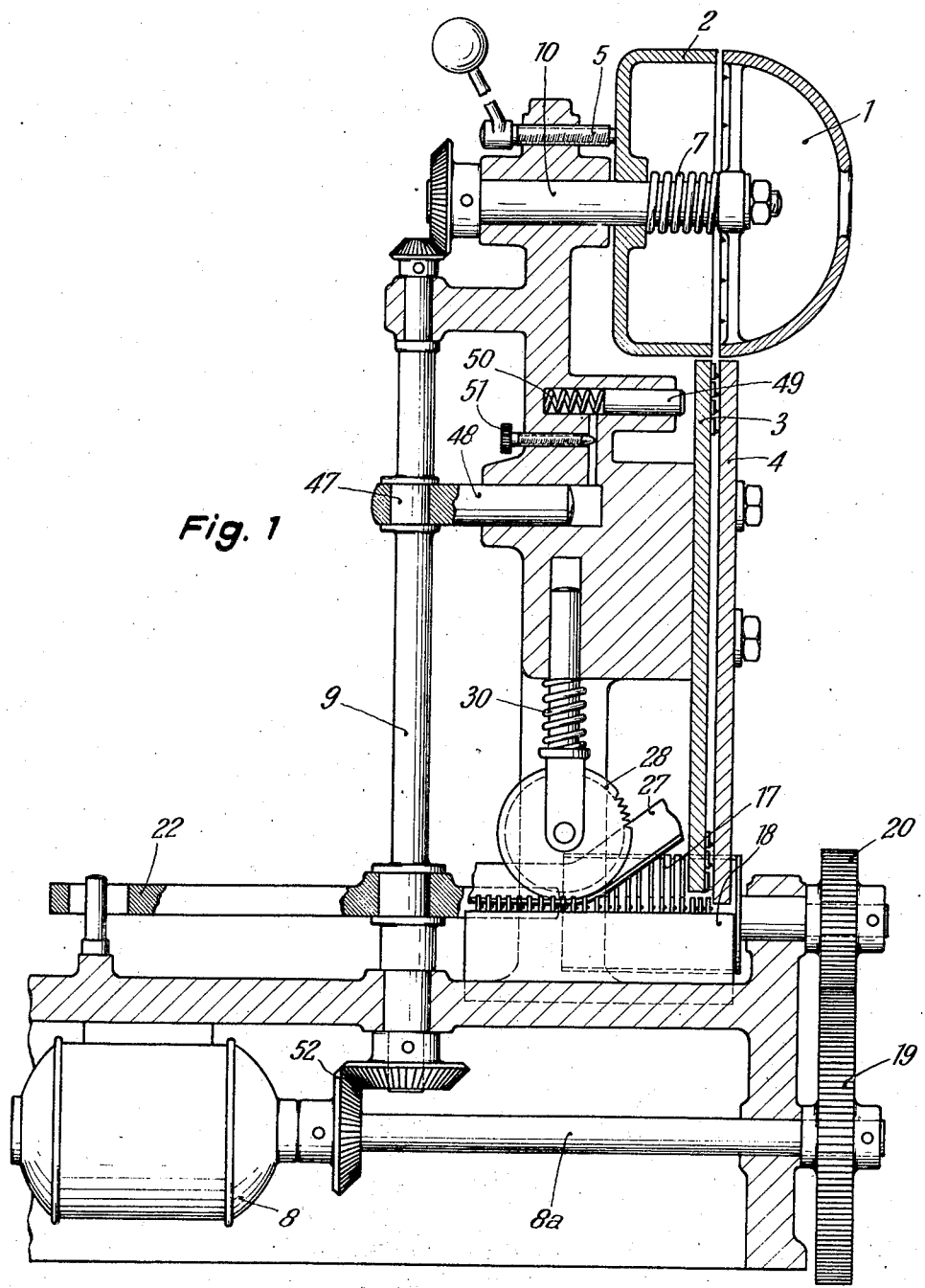

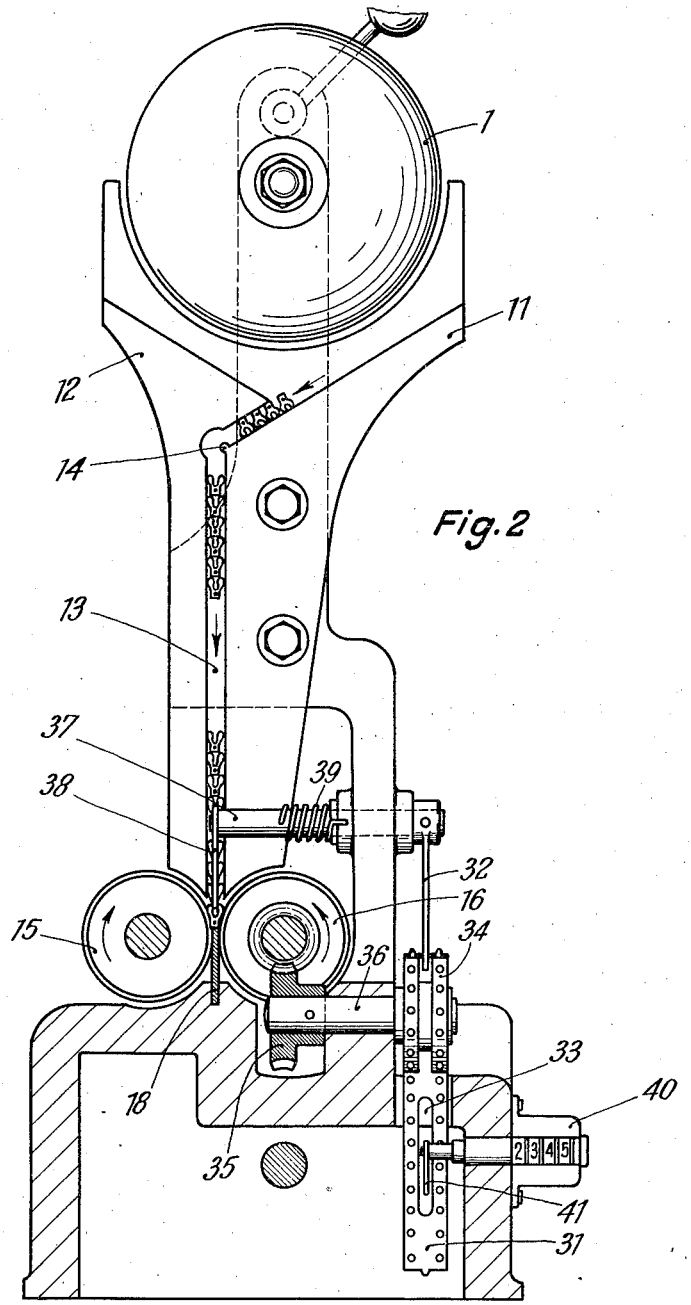

Oct. 5, 1937.  K. F. NÄGELE  2,094,715
APPARATUS FOR THE MANUFACTURE OF ZIP FASTENERS
Filed March 21, 1935  3 Sheets-Sheet 3
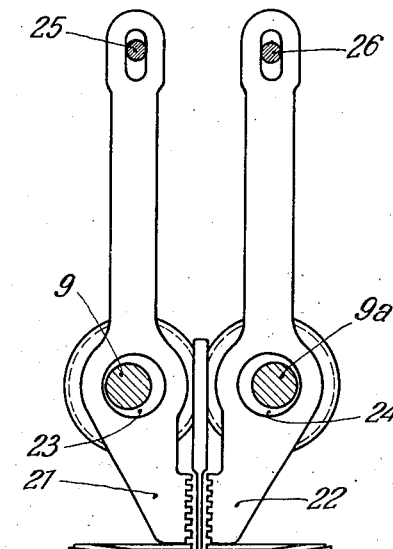
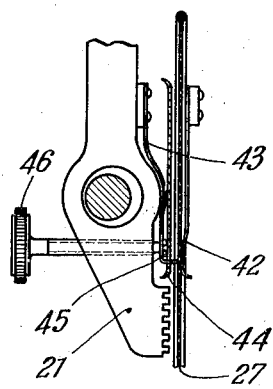
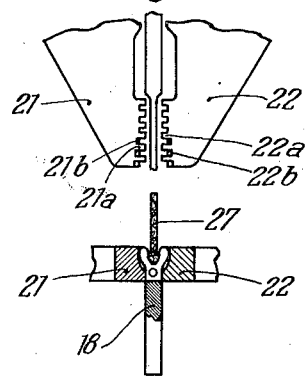
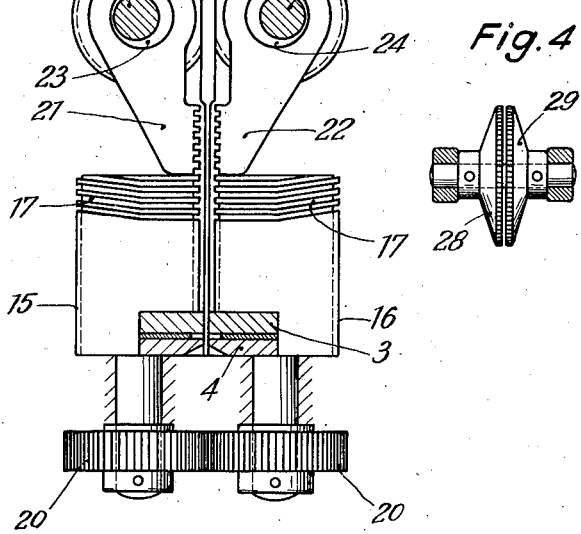
INVENTOR.
Karl F. Nägele
by [signature] Atty.

Patented Oct. 5, 1937

2,094,715

UNITED STATES PATENT OFFICE 2,094,715

APPARATUS FOR THE MANUFACTURE OF ZIP FASTENERS

Karl Friedrich Nägele, Berlin-Neukolln, Germany

Application March 21, 1935, Serial No. 12,306
In Germany March 23, 1934

9 Claims. (Cl. 153—1)

The invention relates to an apparatus for the manufacture of zip fasteners, in which apparatus eccentrics preferably running in opposite directions are fitted as clamp-jaws for pressing the fastener links on to the band, these eccentrics at the same time moving the band forward intermittently. The invention essentially consists of having screw conveyors mounted directly in front of the clamp-jaws, in the direction in which the band travels, in order to feed the fastener links forward, these screw conveyors running in opposite directions and taking up the links between their threads, while the said threads have a pitch only over a part of their periphery and there is a band conveyor roller, in the form of a clamp roller, mounted at the point of impact of the clamp-jaws and screw conveyors which roller feeds the band between the screw conveyors and presses it between the open shanks of the fastener links. The feeding of the fastener links between the screw conveyors is effected by means of a magazine mounted above the screw conveyors, in the channel of which magazine there is fitted a catch by means of which it is possible to fix the number of links fed forward and thus the length of the zip fasteners. This catch device is advantageously coupled to an endless control belt the formation of which causes the catch to stop or to commence the feeding of fastener links.

The machine according to the invention has the advantage, as compared with known machines for the manufacture of zip fasteners, that extremely simple machine parts, performing for the most part only rotary movements, are used, so that the performance of the machines equals or even surpasses that of the known large and complicated zip fastener machines.

In the drawings the machine according to the invention is shown in one form of construction.

Fig. 1 is a vertical longitudinal section of the machine, this section being taken through a press-jaw and running partly along the screw conveyors.

Fig. 2 is a front view of the machine.

Fig. 3 is a plan-view of the screw conveyors and the press-jaws.

Fig. 4 is a front-view of the device for pressing in the belt or band of material.

Fig. 5 is a plan-view of a press-jaw with the device for feeding forward the band of material.

Fig. 6 is a partial plan-view of the press-jaws with the teeth formation.

Fig. 7 is a cross-section through the press-jaws as in Fig. 6.

In accordance with the invention two vertical shafts 9 and 9a, fitted with eccentrics 23 and 24, are coupled by means of mitre wheels 52 with the shaft 8a of a motor 8 at one end, while the other end of the shaft 8a is coupled by means of toothed wheels 19 and 20 to two feed cylinders 15 and 16 running in opposite directions to each other. The eccentrics 23 and 24 running in opposite directions to each other engage with two press-jaws 21 and 22 the distance between which is adjustable. The press-jaws are held in a certain position by means of guide pins 25 and 26 which for their part are eccentrically adjustable and thus make it possible to regulate or adjust the press-jaws.

The two feed cylinders 15 and 16 running in opposite directions to each other have threads 17 which run partly with and partly without a pitch inclined to the direction of travel. (Fig. 3). The distance of the threads 17 from each other corresponds to the distance of the fastener links from each other, but it can be arranged so that only the end threads of the feed cylinders produce the necessary distance of the links from each other. One of the feed cylinders 16 is coupled, by means of a worm and wheel 35 and the shaft 36, to a driving wheel 34—subdivided and fitted with teeth—over which wheel there is placed an endless band 31 of fabric or metal which is provided with perforations. The teeth of the driving wheel 34 engage, as in the case of a cinematographic film, in the perforations of the control band 31. This band 31, only the rear half of which is shown in Fig. 2, is held rigid by a roller placed in the loosely hanging end and is adjustable as regards length owing to the fact that one end of the band has a hook which can be inserted in corresponding slots in the band. The band 31 has in addition a slot 33 which serves to control the length of the zip fasteners by the fact that a lever 32, held under tension by a spring 39, projects into this slot when the said slot 33 is passing the said lever 32. The lever 32 is connected, by means of a shaft 37, to a catch 38 which, when the lever 32 engages in the slot 33 in the control band 31, enters the passage of the magazine so that no more fastener links can fall.

In addition there is connected to the control band 31 a counter, for example a stroke-counter, the connection being effected by means of a contact lever 41 which can also engage in the slot 33 and which records one more number every time it engages with the slot so that the number of the finished zip fasteners is automatically recorded.

Above the feed cylinders 15, 16, where the press-jaws 21, 22 adjoin the cylinders 15, 16, there is mounted resiliently a roller 28, 29 for pressing in the band of material 27. This roller 28, 29 is of slit formation and holds between the parts 28 and 29 the thin part of a band of material 27 while the teeth with which the roller 28, 29 is fitted at its periphery lie against the thick edge of the band of material 27 and thus press this thick edge between the feet of the zip fastener links.

The press-jaws 21 and 22 are fitted with teeth 21a and 22a and recesses 21b and 22b (Figs. 6 and 7) on their sides which face each other, the distance between the teeth 21a, 22a corresponding to the distance between the links of the zip fastener. The recesses 21b and 22b are of such a shape that their lower part corresponds to the width of the heads of the zip fastener links. The upper parts of the recesses 21a and 21b correspond, in the case of the first one or more recesses behind the feed cylinders 15 and 16, with the width of the open link feet (Fig. 7), while the adjoining recesses narrow, at their upper parts, to as little as the width of the link heads or as the thickness of the finished zip fastener. (Fig. 6.)

One of the press-jaws 21 is provided with a grip spring 43, which passes through a slot in a fixed guide wall 44 for the band of material 27 (Fig. 5), against which band a spring 42 presses on the other side, this latter spring being weaker than the grip spring 43. The grip spring 43 is adjustable by means of a spring stop 45 and a set screw 46, so that in this way with a given eccentricity of the press-jaws 21, 22 the forward feed of the band of material 27 can be accurately adjusted to the distance between the links of the zip fastener. Naturally it is also possible to provide both press-jaws with a grip spring and to guide the band of material between two fixed walls 44.

In the example of construction shown the ratios of transmission are so selected that one revolution of the eccentrically operating press-jaws 21 and 22 corresponds to one revolution of the feed cylinders 15 and 16. In addition with one revolution of the feed cylinders and the press-jaws the endless control band 31 is moved forward by one division, so that this division, which is marked by perforations in the control band 31, corresponds to the distance between the links of the zip fastener, so that in the case of an alteration in the length of the fasteners the number of links of the zip fastener can be altered at will by means of the control slot 33 of the endless control band.

Instead of having the feed of the zip fastener links achieved by means of feed cylinders fitted with threads, any other desired feed devices can be used and in addition the speed of revolution of the feed cylinders can be much greater than that of the press-jaws.

The way in which the machine according to the invention works is as follows:

The zip fastener links, manufactured in the known way, are thrown into a sorting drum 1, 2, the front half 1 of which faces the rear half 2, between which two halves there is a radial slot through which the links pass through to the magazine passage 13 over the guides 11, 12, this magazine passage being formed by the two plates 3 and 4. As the width of the drum slot influences the quantity of zip fastener links ejected, this slot is made adjustable by having a spring 7 pressing the drum half 2 against a stop 5 which is adjustable by means of a lever 6. The sorting drum 1, 2 is driven by the shaft 9 with the aid of a shaft 10 and spur wheels, the said shaft 9— for the purpose of simplifying the construction of the machine, at the same time driving one of the press-jaws 21, 22. The shaft 9 carries an eccentric 47 with which is coupled a piston 48 reciprocating in a cylinder. The piston 48 is formed with a terminal opening with which the eccentric 47 cooperates, the opening being formed in line with the piston so as to respond to the eccentric and formed transversely of the piston so that the piston is not affected in the movement of the eccentric in a plane at right angles to that of the piston, a conventional construction not requiring illustration. A striking hammer 49 is controlled through a channel from the cylinder of this piston 48, this hammer facing the magazine 3, 4 and being supported on spring 50. As the piston 48 travels backward and forward an excess or negative fluid pressure is produced by means of which the hammer 49 is driven backward and forward. The strength of the hammer blows is adjustable by means of a throttle 51. This striking of blows against the magazine 3, 4 is necessary because, owing to the high working speed, large quantities of zip fastener links are needed by the machine and the speed at which these links fall through the magazine track 13 is increased by the vibratory effect of the blows.

Under the action described, the hammer 49 makes rapid successive impacts of relatively slight force against the wall 3. The hammer 49 is obviously driven by the variation in pressure in the cylinder incident to the respective movements of the piston 48, the movement of the piston in one direction exerting force against the hammer and in the opposite direction relieving the pressure to an extent to create a suction effect. The movement of the hammers is quite small and the impact force relatively slight and the pressure created and reduced in the movement of the piston is sufficient for the purpose. The spring 50 cooperating with each piston is a secondary pressure element tending in effect to somewhat support the impact action and serve to position the hammer in a proper inoperative position to be effected properly in the movement of the piston.

From the magazine track 3, 4 the zip fastener links pass into the threads of the feed cylinders 15, 16. In order that in each case only one link passes into any one thread, the magazine is tapered towards the bottom and provided with a gap at the rear (Fig. 1) the height of which is such that only one link can be taken by the threads, while the following link is held by the rear wall 3. The position of the cylinders 15 and 16 in respect of the magazine 13 is furthermore arranged so that a straight part of the thread of both cylinders lies vertically beneath the magazine. The falling link has therefore sufficient time to fall into this straight part as it can pass any desired distance round the periphery of the feed cylinders and only a short section of the threads needs to run helically with a pitch in order to feed forward the zip fastener link by one division to correspond with the zip fastener divisions.

The distance between the threads of the cylinders 15 and 16 is preferably adjusted in advance to the distance between the zip fastener links, as moreover has been represented in the example of construction. In this example of construction the zip fastener links fall out of the magazine in such a way that their heads are facing downwards—this being achieved by means of a projection 14 fitted in the magazine 13. As soon as the links emerge from the magazine they are taken up, their heads sliding along a guide plate 18, by the two feed cylinders 15 and 16 through the threads 17 of which the desired distance between the links of the zip fastener is at the same time achieved. Shortly before the zip fastener links reach the press jaws 21 and 22, a band of material 27 is introduced by the roller 28, 29 between the feet of the links, from above. This roller 28, 29, which lies above the point of contact of the press-jaws 21 and 22 and the feed cylinders, has at the same time the task of pressing the zip fastener links tightly against the guide plate 18, so that the links become uniform in height. The pressing down of the links is effected by the fact that the teeth of the roller 28, 29 lie against the thick edge of the band of material 27 and the band of material is pressed by these teeth between the feet of the links, so that at the same time the links are also held tightly against the guide plate 18. As the thick edge of the band of material is wedged between the feet of the links, the pulling out of the band of material would be possible, without special aids, by means of the forward feed of the zip fastener links by the feed cylinders. In order however to avoid stretching the band of material with different intensity, the press-jaws, as described above, are fitted with special grip springs 43 which feed forward the band of material by the length of the distance between the links of the zip fastener with every revolution of the press-jaws. After the band of material 27 has been inserted between the feet of the links of the zip fastener, the said zip fastener links pass between the press-jaws 21 and 22, they being then fed forward by one or more tooth divisions when the press-jaws 21 and 22 go into the pressing position. This advancing of the links is effected by the helical part of the feed cylinders 15 and 16. The length of this part of the feed cylinders which is fitted with pitched threads is determined by the eccentricity of the press-jaws 21 and 22, as the links must be fed forward as long as the teeth of the press-jaws are in the region of the zip fastener links.

When the zip fastener links pass from the feed cylinders 15, 16 between the toothed press-jaws, the first one or more links passing between the press-jaws are turned straight by recesses 21b and 22b of suitable shape. The farther the links pass between the press-jaws, the more the link feet are wedged on to the band of material 27 until finally they are mounted absolutely firmly on the band. During the pressing process the links are moreover held in a perfectly uniform position by the lower part of the press-jaws which lie against the head of the links. Thus through the lateral pressure of the lower parts of the press-jaws and through the pressure from above the roller 28, 29 the band of material is uniformly edged with zip fastener links and owing to the fact that the links are pressed on to the band of material in several stages, not only is excessive and sudden deformation of the link material avoided but in addition owing to the gradual pressing process the links are more firmly attached to the band of material.

As in the machine according to the invention use is made of an endless band of material 27 and as part of the band of material must not be edged with links in order to make it possible to fasten the zip fastener to a garment or the like, the feeding of the zip fastener links must cease after a certain length of fastener has been made. In order to produce this length of zip fastener and to stop the advancing of the falling zip fastener links, an endless control belt is employed, as already mentioned above. As long as the lever 32, to which is coupled the catch 38 which projects into the magazine 13, rests on the surface of the endless control belt 31, the zip fastener links can emerge from the magazine. But when the lever 32 passes through the slot 33 in the endless control belt 31, the feeding of zip fastener links from the magazine is held up as long as the lever 32 remains in this slot 33. Therefore over a length corresponding to the length of slot 33 the band of material is not edged with links. As soon as the lever 32 is again lifted out of the slot 33 in the control belt 31, the zip fastener links are once again fed forward, and so on.

I claim:—

1. An apparatus for the manufacture of zip fasteners wherein the fasteners are clamped in regular spaced order upon the edge of a band of considerable length, including a feeding means leading from a source of supply and delivering the fasteners singly with their band receiving portions uppermost, continuously operating cooperating elements receiving the fasteners singly from the feeding means and advancing said fasteners in a predetermined direction in regular spaced order, a band receiving and feeding element serving to clamp and feed an appropriate band in the direction of fastener movement while laying a portion of the band within the band receiving portion of the fasteners in succession, clamping jaws arranged immediately beyond the point of cooperation of the band and fasteners to engage and progressively clamp the band receiving portions of the fasteners with respect to the band, and means for imparting to the clamping jaws a movement for feeding the band and clamped fasteners thereon in a step-by-step movement while progressively clamping the fasteners on the band.

2. An apparatus for the manufacture of zip fasteners wherein fastener elements are clamped upon the edge of a band of considerable length, comprising a fastener conveying means formed to receive the fasteners singly with the band receiving portion uppermost and progressively advance the fasteners in the line of feed, a band feeding element operating above the conveying means and progressively and continuously advancing a band in the direction of feed of the fasteners, said band feeding element being in a position to lay a particular portion of the band within the band receiving portion of the fasteners, and clamping jaws operating immediately beyond the cooperation of the band and fasteners and serving to progressively clamp the band receiving portions of the fasteners with respect to the band, said clamping jaws progressively advancing the clamped fasteners and band in a step-by-step movement during the progressive clamping action.

3. A zip fastener apparatus including a conveyor made up of oppositely acting rolls having peripheral channels formed in the movement of the rolls to progressively and singly advance fastener elements delivered thereto, a feed chute through which the fastener elements are delivered singly to the rolls with their band receiving portions uppermost, a band feeding roller gripping and feeding the band in the direction of fastener movement, said feeding roller being arranged to deliver a portion of the band into the band receiving portions of the fasteners in succession, clamping jaws receiving the cooperating fasteners and band progressively in a step-by-step movement, and means for operating the clamping jaws to clamp the fasteners onto the band and progressively advance the clamped fasteners and band in the general direction of feed.

4. A construction as defined in claim 3, wherein the fastener receiving thread of the conveyor rolls is in part of normal thread pitch and in part of abnormal thread pitch to insure the proper reception and proper feeding of the fasteners received thereby.

5. A construction as defined in claim 3, wherein the clamping jaws are formed with opposed notches to receive the zip fasteners in succession and with zip fastener clamping surfaces progressively reduced in width in the direction of feed.

6. A construction as defined in claim 3, wherein means are provided for automatically limiting the number of fasteners fed to the conveyor.

7. A construction as defined in claim 3, wherein means are provided for agitating the feed chute to insure proper delivery of the zip fasteners to the conveyor.

8. A construction as defined in claim 3, wherein the band feeding roller is made up of sections to grip the band therebetween, with the edges of the sections formed with notches to successively cooperate with the upper portions of the zip fasteners during the placing of the band therebetween.

9. A construction as defined in claim 3, wherein an element is included which is interposed in the path of the fastener in the feeding chute to interrupt the fastener passage thereto, and an endless driven member formed to control said element, said member being adjustable to vary the control to thereby vary the number of zip fasteners delivered at a single operation.

KARL FRIEDRICH NÄGELE.